US011986767B2

United States Patent
Kukreja et al.

(10) Patent No.: US 11,986,767 B2
(45) Date of Patent: May 21, 2024

(54) REGENERATIVE SEPARATING DEVICE FOR SEPARATING IMPURITIES FROM AN AIRFLOW

(71) Applicant: Dürr Systems AG, Bietigheim-Bissingen (DE)

(72) Inventors: Ankit Kukreja, Uttar Pradesh (IN); Erhard Rieder, Herrenberg (DE); Jason T. Schroder, Monroe, MI (US); Sven Meyer, Bingen am Rhein (DE); Lars Mast, Tamm (DE)

(73) Assignee: DÜRR SYSTEMS AG, Bietigheim-Bissingen (DE)

( * ) Notice: Subject to any disclaimer, the term of this patent is extended or adjusted under 35 U.S.C. 154(b) by 374 days.

(21) Appl. No.: 17/296,004

(22) PCT Filed: Dec. 6, 2019

(86) PCT No.: PCT/EP2019/083989
§ 371 (c)(1),
(2) Date: May 21, 2021

(87) PCT Pub. No.: WO2020/126551
PCT Pub. Date: Jun. 25, 2020

(65) Prior Publication Data
US 2022/0008863 A1    Jan. 13, 2022

Related U.S. Application Data

(63) Continuation-in-part of application No. 16/224,489, filed on Dec. 18, 2018, now Pat. No. 11,071,941.

(51) Int. Cl.
*B01D 53/06* (2006.01)
(52) U.S. Cl.
CPC ........ *B01D 53/06* (2013.01); *B01D 2253/102* (2013.01); *B01D 2253/108* (2013.01);
(Continued)

(58) Field of Classification Search
CPC .. B01D 53/04; B01D 53/06; B01D 2253/102; B01D 2253/108; B01D 2259/4009; B01D 53/0431; B01D 53/0446; F24F 2203/1068
(Continued)

(56) References Cited

U.S. PATENT DOCUMENTS

| 2,639,000 | A | * | 5/1953 | Edwards | ................ | B01D 53/06 |
| | | | | | | 210/392 |
| 4,589,892 | A | * | 5/1986 | Leonard | ................ | F24F 3/1423 |
| | | | | | | 96/115 |

(Continued)

FOREIGN PATENT DOCUMENTS

| JP | S4951756 A | 5/1974 |
| JP | 1977115748 | 9/1977 |

(Continued)

OTHER PUBLICATIONS

International Search Report and Written Opinion received in PCT/EP2019/083989 dated Mar. 5, 2020.
(Continued)

*Primary Examiner* — Christopher P Jones
*Assistant Examiner* — Sonji Turner
(74) *Attorney, Agent, or Firm* — Greer, Burns & Crain, Ltd

(57) ABSTRACT

An improved regenerative separating device for separating impurities from an airflow, in particular a process exhaust airflow, provides a better distribution of the airflow in an annular gap between a rotary separating unit including a plurality of filter blocks for adsorbing impurities from the airflow and a circumferential wall of a housing incorporating the rotary separating unit. The airflow inlet provided in the circumferential wall for introducing the airflow into the annular gap and a regeneration system for regenerating the filter blocks of the rotary separating unit by a regenerating
(Continued)

stream passing through the filter blocks to desorb impurities adsorbed in the filter blocks are both positioned in the same circumferential sector of maximum 180 degrees.

16 Claims, 6 Drawing Sheets

(52) U.S. Cl.
CPC ................ *B01D 2259/4009* (2013.01); *F24F 2203/1068* (2013.01)

(58) Field of Classification Search
USPC .................................. 96/108–154; 95/90–148
See application file for complete search history.

(56) References Cited

U.S. PATENT DOCUMENTS

| | | | | |
|---|---|---|---|---|
| 4,846,855 A * | 7/1989 | Tsujimoto | ............. | B01D 53/06 96/123 |
| 5,017,202 A * | 5/1991 | Ogata | .................... | B01D 53/06 96/125 |
| 5,169,414 A * | 12/1992 | Panzica | ................. | F24F 3/1423 96/125 |
| 5,693,123 A * | 12/1997 | Klobucar | ............... | B01D 53/06 96/144 |
| 5,788,744 A | 8/1998 | Klobucar et al. | | |
| 6,478,855 B1 * | 11/2002 | Okano | .................. | F24F 3/1423 95/126 |
| 8,052,783 B2 * | 11/2011 | Baker | .................... | B01D 53/06 96/125 |
| 10,682,604 B2 | 6/2020 | Herm et al. | | |
| 2015/0360167 A1 * | 12/2015 | Kalbassi | ............ | B01D 53/0431 96/108 |
| 2017/0266606 A1 * | 9/2017 | Herm | ..................... | B01D 53/06 |
| 2018/0345205 A1 * | 12/2018 | Herm | ................. | B01D 53/0446 |

FOREIGN PATENT DOCUMENTS

| | | |
|---|---|---|
| JP | 2002239329 A | 8/2002 |
| JP | 2007083238 A | 4/2007 |
| JP | 2016002548 A | 1/2016 |

OTHER PUBLICATIONS

JP Office Action with translation for corresponding Japanese Patent Application No. 2021-534368 dated Dec. 26, 2023 (3 pages).

* cited by examiner

REGENERATIVE SEPARATING DEVICE FOR SEPARATING IMPURITIES FROM AN AIRFLOW

BACKGROUND

The present invention relates to a regenerative separating device for separating impurities from an airflow, in particular a process exhaust airflow, and especially to a carousel-type regenerative separating device. Such a separating device may be used e.g. for separating organic solvents from solvent-containing process exhaust air, for example for use in an industrial surface treatment plant.

Conventional carousel-type regenerative separating devices comprise a rotary separating unit comprising a plurality of filter blocks for adsorbing impurities from an airflow passing through the filter blocks in a radial direction of the separating unit, a cuboidal housing for incorporating the separating unit with an annular gap between a circumferential wall of the housing and the separating unit. The housing has an airflow inlet provided in its circumferential wall for introducing an airflow into the annular gap, and the separating device further comprises a regeneration system for regenerating the filter blocks of the rotary separating unit by a regenerating stream radially passing through the filter blocks to desorb impurities adsorbed therein.

As disclosed e.g. in U.S. Pat. No. 5,788,744 A and US 2018/0345205 A1, the regeneration system typically is arranged opposite to the airflow inlet. The present inventors have found out that, in those conventional separating devices, the airflow entering the annular gap mainly loads the front section of the rotary separating unit facing the airflow inlet resulting in a limitation of filtering efficiency of the separating unit.

SUMMARY

It is an object of the present invention to provide an improved carousel-type regenerative separating device having a better filtering efficiency.

According to the present invention, there is provided a regenerative separating device for separating impurities from an airflow, in particular a process exhaust airflow, comprising:
  a rotary separating unit defining a radial direction and a circumferential direction and comprising a plurality of filter blocks for receiving impurities from an airflow passing through the filter blocks in the radial direction; a housing for incorporating the rotary separating unit with an annular gap between a circumferential wall of the housing and the rotary separating unit, wherein the housing has an airflow inlet provided in its circumferential wall for introducing an airflow into the annular gap; and a regeneration system for regenerating the filter blocks of the rotary separating unit by a regenerating stream passing through the filter blocks in the radial direction to remove impurities received in the filter blocks, wherein the airflow inlet and the regeneration system are both positioned in the same circumferential sector of maximum 180 degrees.

Positioning the airflow inlet and the regeneration system both in the same circumferential sector of maximum 180 degrees, i.e. on the same side of the rotary separating unit, instead opposite to each other, opens various possibilities to achieve a more uniform distribution of the airflow in the annular gap and a more uniform loading of the filter blocks of the rotary separating unit, resulting in a better filtering efficiency of the separating unit. An improved filtering efficiency helps in reducing impurity (e.g. organic solvent) emissions and to comply with state regulations.

In addition, the suggested structure also opens various possibilities to simplify the construction of the regenerative separating device. Such simplified constructions reduce the fabrication and maintenance complexity and cost.

The airflow inlet and the regeneration system are both positioned in the same circumferential sector of maximum 180 degrees, preferably of maximum 150 degrees, more preferably of maximum 120 degrees. In some embodiments, they are positioned in the same circumferential sector of maximum 90 degrees or maximum 45 degrees. In some embodiments, they are positioned within about ±5 degrees to each other.

Preferably, the regeneration stream passes through the filter blocks of the separating unit in a radial direction opposite to the airflow radially passing through the filter blocks. In this case, the regeneration stream comprises a regeneration stream outlet on the side of the separating unit facing towards the circumferential wall of the housing. Hence, this regeneration stream outlet is positioned in the same circumferential sector of maximum 180 degrees as the airflow inlet in the circumferential wall of the housing.

In the filter blocks of the rotary separating unit, the impurities contained in the airflow (e.g. organic solvents) can be physically attached when passing therethrough. The filter blocks are preferably configured to adsorb or absorb the impurities or the like. For this purpose, the filter blocks preferably include activated carbon, zeolite or another suited filter material. The regeneration stream preferably is hot air, preferably in a temperature range of about 140° C. to 450° C.

Preferably, the housing is a cylindrical housing. A cylindrical housing enables an even more uniform distribution of the airflow in the annular gap resulting in a better filtering efficiency of the separating unit and a simplified construction of the regenerative separating device.

In some embodiments, the airflow inlet and the regeneration system may overlap each other in the circumferential direction. In such configurations, the airflow inlet is preferably configured to radially introduce an airflow into the annular gap between the circumferential wall of the housing and the rotary separating unit. In this way, the regeneration system, especially the regeneration stream outlet, can act as a diverter for the airflow hitting it frontally so that the airflow is spread farther into the annular gap between the separating unit and the circumferential wall of the housing resulting in a more uniformly distributed passage of the air flow through the filter blocks.

In some other embodiments, the airflow inlet and the regeneration system may be arranged next to each other in the circumferential direction. In such configurations, the airflow inlet is preferably configured to introduce an airflow in tangential direction into the annular gap between the circumferential wall of the housing and the rotary separating unit. Due to the tangentially inflowing airflow, the airflow does not hit the rotary separating unit frontally but flows farther into the annular gap between the separating unit and the circumferential wall of the housing resulting in a more uniformly distributed passage of the air flow through the filter blocks. Preferably, the airflow is introduced into the annular gap in a tangential direction away from the regeneration system. In this way, there is a clearer thermal separation between the airflow and the regenerating stream so that insulation measures can be reduced.

In some embodiments, the annular gap between the circumferential wall of the housing and the rotary separating unit may have a tapered width in the radial direction becoming narrower in a direction away from the airflow inlet. Preferably, this is implemented by the cylinder axis of the cylindrical housing and the rotational axis of the rotary separating unit being offset to each other. Due to the annular gap having a tapered width, the force for the airflow to enter the filter blocks is lower near the airflow inlet and is increasing with distance from the airflow inlet. Thus, the airflow is spread farther into the annular gap between the separating unit and the circumferential wall of the housing resulting in a more uniformly distributed passage of the air flow through the filter blocks.

In some embodiments, there may be provided at least one baffle in the airflow inlet for guiding the airflow. Preferably, the airflow is guided in a way to support the above-discussed effect to spread the airflow farther into the annular gap between the separating unit and the circumferential wall of the housing, depending on the specific configuration and positioning of the airflow inlet.

In some embodiments, the regeneration system may comprise a regeneration stream outlet for discharging said regeneration stream having passed through said filter blocks which is divided into two sections, in said circumferential direction, for discharging a first partial regeneration stream and a second partial regeneration stream. Preferably, this regeneration stream outlet comprises a divider being configured to variably control the widths of the two sections. The preferred variants and effects of this configuration are disclosed in detail in e.g. US 2017/0266606 A1 and US 2018/0345205 A1.

In some embodiments, the rotary separating unit may comprise a rotor cage for mounting the plurality of filter blocks. In connection with the inventive concept, the construction of this rotor cage can be simplified. For example, it can be fabricated with less (e.g. only three) components compared to rotor cage designs of conventional regenerative separating devices.

In some embodiments, the rotary separating unit may be rotated by a driving system comprising a chain and a sprocket. The inventive concept enables such a simplified and efficient driving system, compared to e.g. a geared bottom plate driven by a pinion driver gear often used in conventional regenerative separating devices.

In some embodiments, the regenerative separating device may further comprise a cooling system for directing a cooling airflow through the filter blocks in the radial direction, wherein this cooling system is arranged between the regeneration system and the airflow inlet in the rotational direction of the rotary separating unit. By this cooling system, after a regeneration process, the filter blocks of the rotary separating unit are cooled down from the elevated regeneration temperatures to a temperature range suited for receiving the impurities from the airflow.

In some embodiments, the housing may comprise just two doors as inspection accesses, wherein these two doors are positioned in the same circumferential sector of maximum 180 degrees as the airflow inlet and the regeneration system. The inventive concept enables such a small number of inspection accesses, compared to conventional regenerative separating devices, especially because all components to be inspected are arranged on the same side of the separating device.

Any feature described above in relation to any one embodiment may also be used in combination with one or more features of any other embodiment or any combination of other embodiments.

According to another aspect of the present invention, a system for separating impurities from an airflow, in particular a process exhaust airflow, comprises an above-discussed regenerative separating device according to the present invention, and a cleaning device for extracting the impurities from the regeneration stream.

Preferably, the cleaning device is configured for regenerative thermal oxidation (RTO), direct thermal oxidation (TO), recuperative catalytic oxidation (CO), regenerative catalytic oxidation (RCO), condensation or the like, or comprises a gas turbine aggregate having a combustion apparatus for combusting the combustible components contained in the regeneration stream.

The above-described regenerative separating device of the invention and the above-described system of the invention can be used in a particularly advantageous manner in industrial surface treatment plants for treating a surface of a workpiece. Preferably, they can be used in painting plants for painting vehicle parts such as in particular vehicle bodies, in which the organic solvent shall be separated from the painting exhaust air. Moreover, the present invention can be used advantageously in all cases of cleaning exhaust gases/exhaust airs loaded with oxidizable pollutants such as for mine gas, exhaust airs from biogas or waste incineration plants, air from printing plants or plastics processing plants loaded with small amounts of VOC, and the like.

BRIEF DESCRIPTION OF THE DRAWINGS

The above and further features of the present invention will become more apparent from the following description with reference to the accompanying drawings, in which.

DETAILED DESCRIPTION

Figure 1:
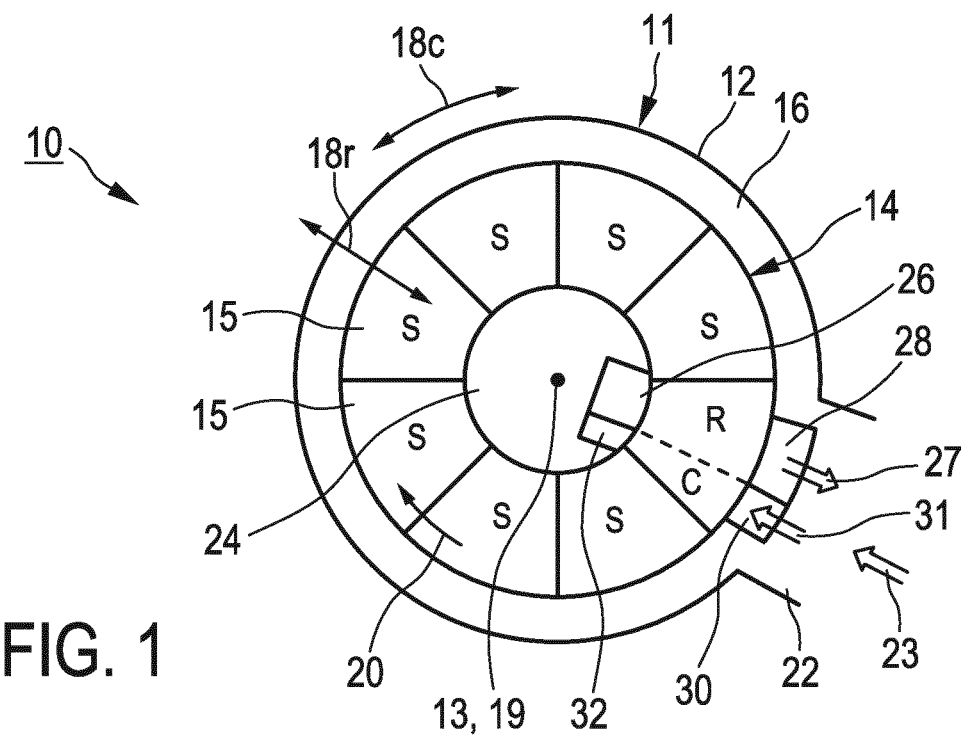
FIG. 1 is a schematic top view showing the principle of a regenerative separating device according to the present invention.

First, the principle of the inventive concept will be explained with reference to FIG. 1. For better understanding, the inventive concept will also be compared to the conventional concept illustrated in FIG. 2.

For separating impurities (e.g. organic solvents), a process exhaust airflow (e.g. solvent-containing painting exhaust air) is directed to a separating device. The process exhaust airflow cleaned in the separating device is discharged and output for example into the environment as so-called clean air or returned back to the process.

The separating device 10 is a carousel-type regenerative separating device comprising a cylindrical housing 11 having a circumferential wall 12 and a central cylinder axis 13. The separating device 10 further comprises a rotary separating unit 14 comprising a plurality of filter blocks 15 and having a rotational axis 19 and a rotational direction 20. The rotary separating unit 14 also defines a radial direction 18r and a circumferential direction 18c. As illustrated in FIG. 1, an annular gap 16 is formed between the circumferential wall 12 of the housing 11 and the rotary separating unit 14.

The housing 11 comprises an airflow inlet 22 for introducing a process exhaust airflow 23 into the annular gap 16 between the circumferential wall 12 and the rotary separating unit 14. From this annular gap, 16, the airflow 23 passes in radial direction 18r through the filter blocks 15 of the rotary separating unit 14. The filter blocks 15 of the rotary separating unit 14 are configured to adsorb or absorb impurities from the airflow 23. The filter blocks 15 may include e.g. activated carbon or zeolite as filter material. The filter blocks 15 may be formed of extruded material and may comprise parallel flow passages as disclosed e.g. in U.S. Pat. No. 5,693,123 A. After having passed through the filter blocks 15, the clean air is discharged via an airflow outlet 24 which is positioned e.g. in a middle area of the top side of the housing 11.

As illustrated in FIG. 1, the separating device 10 further has a regeneration system comprising a regeneration stream inlet 26 for introducing a regeneration stream (e.g. hot air) 27 and a regeneration stream outlet 28 for discharging the regeneration stream after having passed through filter blocks 15 of the rotary separating unit 14. The regeneration stream inlet 26 is positioned e.g. in a middle area of the top side of the housing 11, and the regeneration stream outlet 28 is positioned on the outer side of the rotary separating unit 14 facing towards the circumferential wall 12 of the housing 11. Thus, the regeneration stream 27 passes through the filter blocks 15 of the rotary separating unit 14 in radial direction 18r opposite to the airflow 23 radially passing through the filter blocks 15. The regeneration stream 27 desorbs the impurities from the filter blocks 15 which have been adsorbed by them from the airflow 23.

Preferably, the separating device 10 further has a cooling system comprising a cooling airflow inlet 30 for introducing a cooling airflow 31 and a cooling airflow outlet 32 for discharging the cooling airflow 31. The cooling airflow outlet 32 is positioned e.g. in a middle area of the top side of the housing 11, and the cooling airflow inlet 32 is positioned on the outer side of the rotary separating unit 14 facing towards the circumferential wall 12 of the housing 11. Thus, the cooling airflow 31 passes through the filter blocks 15 of the rotary separating unit 14 in radial direction 18r opposite to the regeneration stream 27 passing through the filter blocks 15. The cooling system is provided next to the regeneration system, in particular after the regeneration system in the rotational direction 20 of the rotary separating unit 14, to cool down the filter blocks 15 after the regeneration process.

As indicated in FIG. 1, the separating device 10 has a separation zone S and a regeneration zone R and a cooling zone C, which are each configured sector-shaped, with the area of the regeneration zone R being dimensioned distinctly smaller than the area of the separation zone S and the area of the cooling zone C being dimensioned smaller than the area of the regeneration zone R. The separating device 10 is operated continuously. I.e. the rotary separation unit 14 and its filter blocks 15 pass the separation zone S, the regeneration zone R and the cooling zone C continuously one after the other in the rotational direction 20.

Functionality, operation and applicability of a regenerative separating device of this kind are known for a person skilled in the art (cf. e.g. US 2017/0266606 A1, US 2018/0345205 A1, U.S. Pat. Nos. 5,788,744 A, 5,693,123 A). Therefore, a more detailed description thereof is omitted here.

According to the present invention, the airflow inlet 22 and the regeneration system, in particular the regeneration stream outlet 28 are both positioned on the same side of the rotary separating unit 14/the separating device 10, i.e. in the same circumferential sector of maximum 180 degrees. If existing, the cooling system, in particular the cooling airflow outlet 32 is also positioned on the same side of the rotary separating unit 14/the separating device 10 as the airflow inlet 22 and the regeneration system.

The positioning of the airflow inlet 22 and the regeneration system 26, 28 both on the same side of the rotary separating unit 14 results in a more uniform distribution of the airflow 23 in the annular gap and a more uniform load into the filter blocks 15. Thus, a better filtering efficiency of the rotary separating unit 14 can be achieved.

Figure 2:
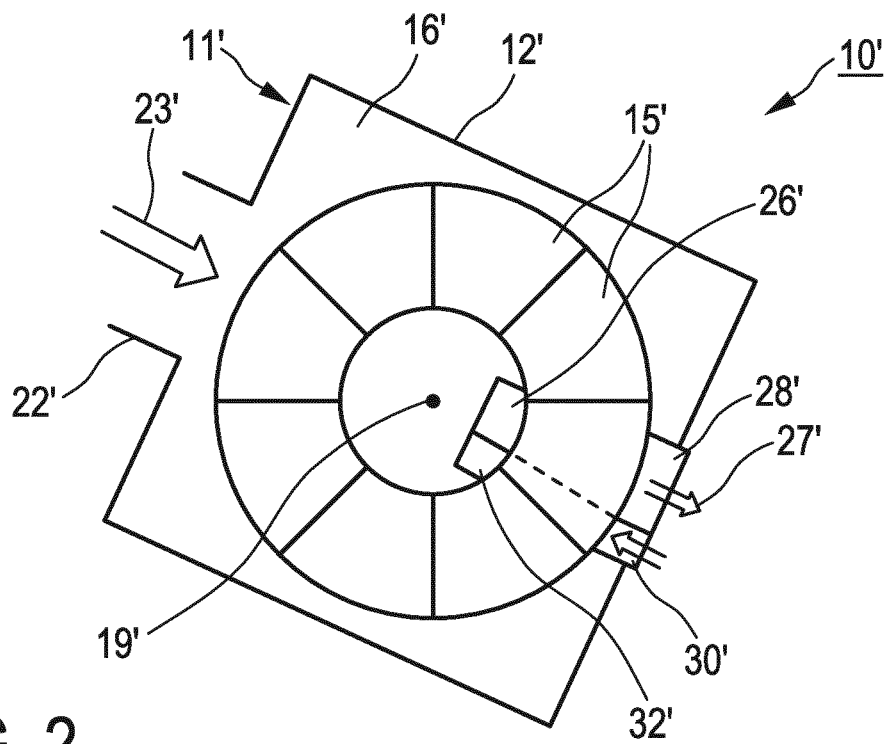
FIG. 2 is a schematic top view showing the principle of a conventional regenerative separating device as comparison.
Figure 3:
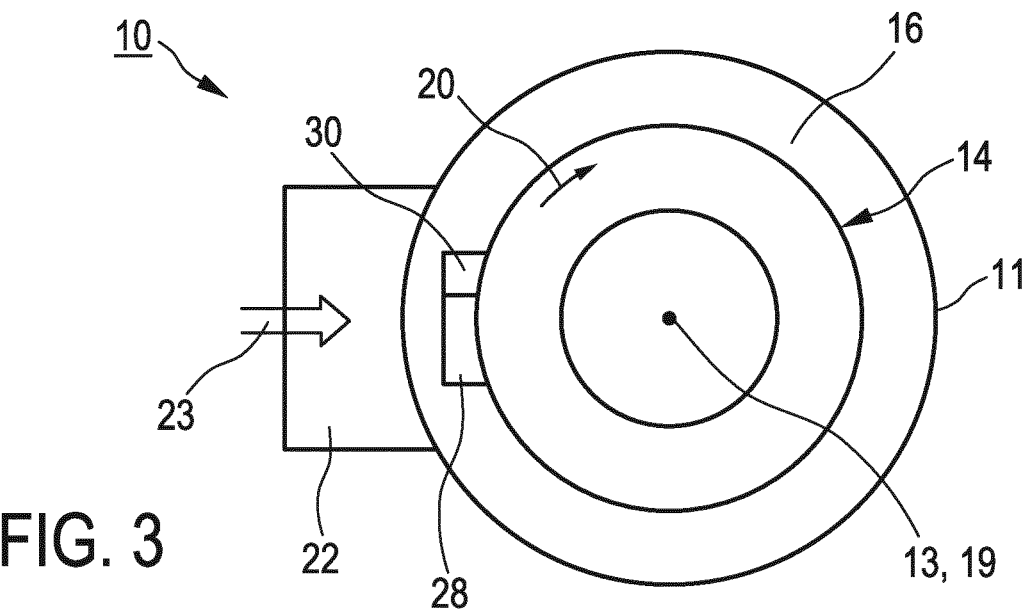
FIG. 3 is a schematic top view of a regenerative separating device according to a first embodiment of the present invention.

For comparison, the concept of conventional separating devices is illustrated in FIG. 2. Corresponding components are labelled with the same reference signs as in FIG. 1 with an additional apostrophe.

The main differences between the inventive concept shown in FIG. 1 and the conventional concept shown in FIG. 2 are the design of the housing and the positions of the regeneration system and the cooling system. In conventional separating devices 10', the housing 11' is formed cuboidal (instead of cylindrical). The regeneration system 26', 28' and the cooling system 30', 32' are arranged next to each other on a side of the separating device 10' opposite to the airflow inlet 22' (instead of being positioned on the same side). As a consequence, the airflow 23' entering the annular gap 16' between the circumferential wall 12' of the housing 11' and the rotary separating unit 14' hits the separating unit 14' frontally so that the front sections of the separating unit 14' facing towards the airflow inlet 22' are loaded/saturated with impurities more than the rear sections thereof.

Referring now to FIGS. 3 to 6, a first embodiment of an inventive separating device 10 is exemplarily explained in more detail.

In this embodiment, the housing 11 and the rotary separating unit 14 are arranged coaxially to each other, i.e. the cylinder axis 13 of the housing 11 and the rotational axis 19 of the rotary separating unit 14 coincide to each other. Thus, the annular gap 16 has a constant width over the whole circumference.

Further, in this embodiment, the airflow inlet 22 is overlapping with the regeneration system and the cooling system, Especially, the regeneration stream outlet 28 and the cooling airflow inlet 30 are positioned within the region of the airflow inlet 22, in the circumferential direction 18c. As a result, the process exhaust airflow 23 entering the annular gap 16 via the airflow inlet 22 hits the regeneration stream outlet 28 and the cooling airflow inlet 30 such that it is diverted in both directions (in rotational direction and opposite to rotational direction of the rotary separating unit 14) farther into the annular gap 16. Thus, the airflow 23 is distributed more uniformly in the annular gap 16.

As a result of the inventive concept, the construction of the separating device 10 can be simplified in some aspects, compared to conventional separating devices.

Figure 5:
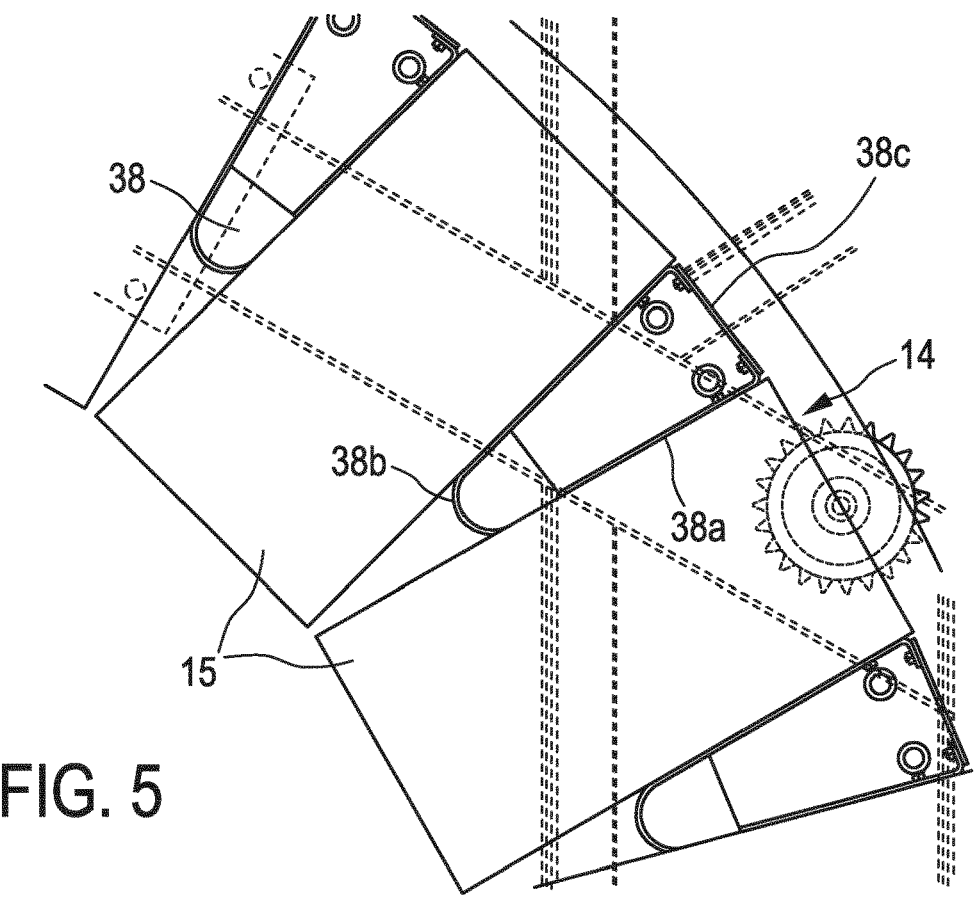
FIG. 5 shows a detail of the rotary separating unit for the regenerative separating device shown in FIG. 4.

As illustrated in FIG. 5, the rotary separating unit 14 comprises a rotor cage 38 for mounting the plurality of filter blocks 15. This rotor cage 38 can be fabricated e.g. only with three components 38a, 38b, 38c.

Also, the required number of vertical seals may be reduced e.g. to ten, compared to conventional designs requiring e.g. about forty-eight seals.

Figure 4:
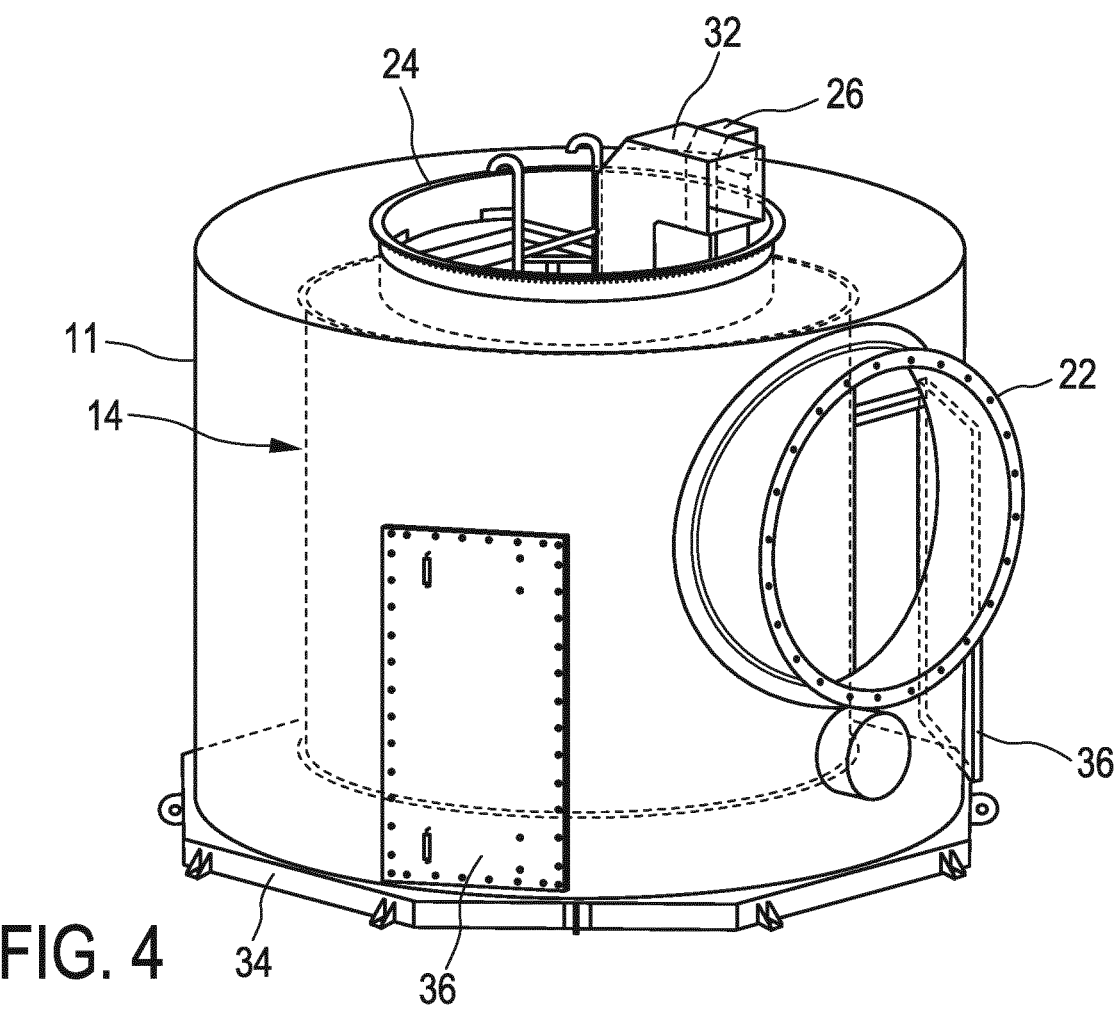
FIG. 4 is a perspective view of the regenerative separating device according to the first embodiment of the present invention.
Figure 6A:
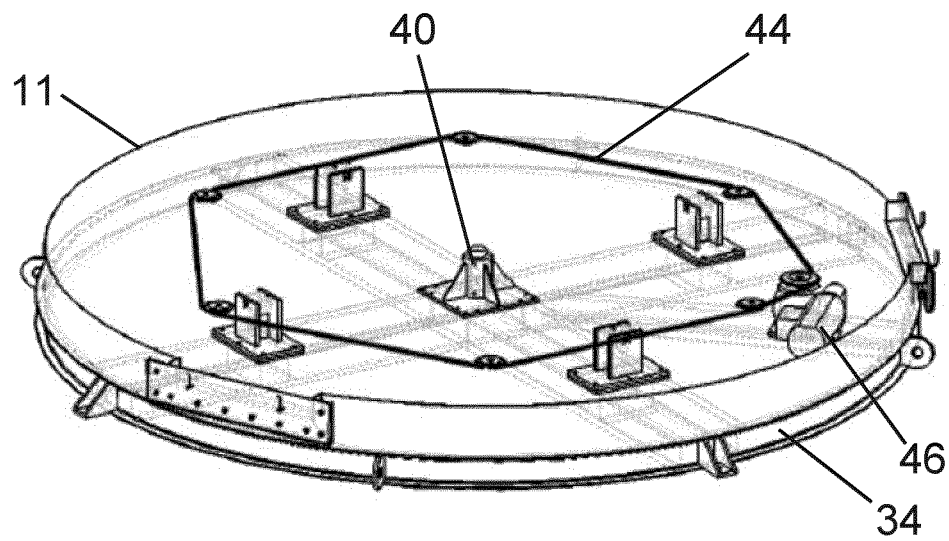
FIGS. 6 and 6A each show a detail of the driving system for the rotary separating unit of the regenerative separating device shown in FIGS. 4 and 4A, respectively.
Figure 6:
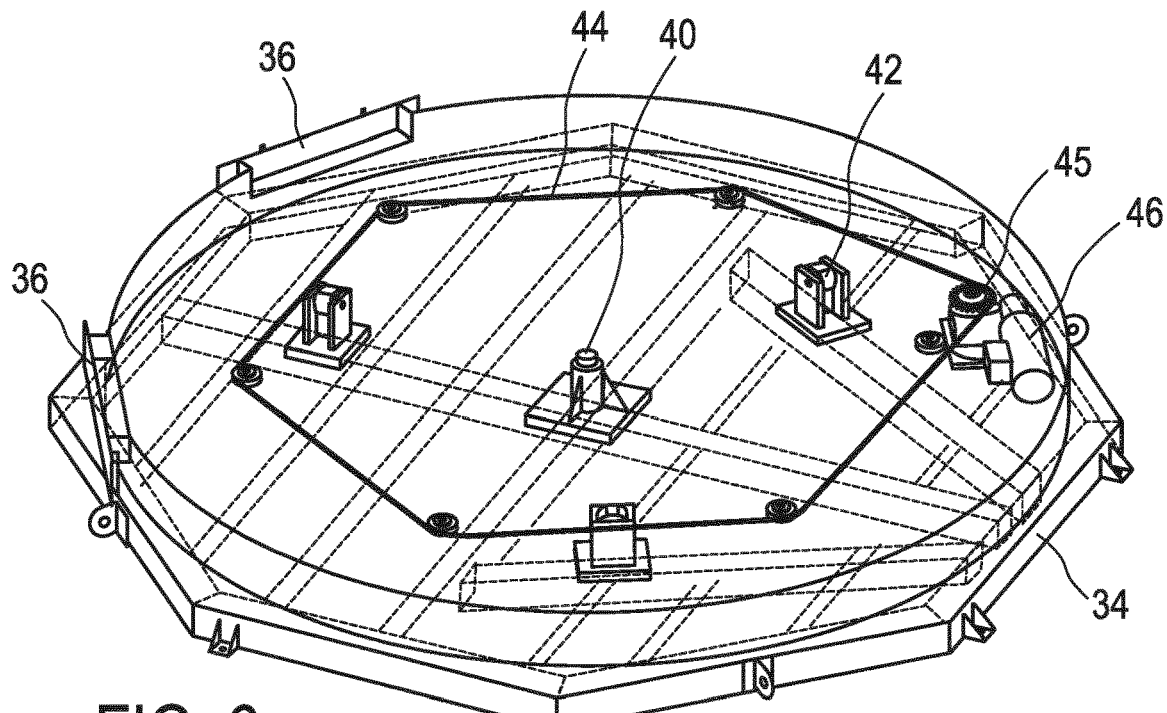

As indicated in FIGS. 4 and 6, only two doors 36 are required as inspection accesses. As all inlets 22, 30 and outlets 28 are arranged on the same side of the separating device 10, all operational and shutdown maintenance can be done from one side of the separating device 10, making the access design simpler. In comparison, in conventional separating devices 10' having a cuboidal housing 11', multiple access hatches and doors are required.

Further, the structure of the driving system for rotating the rotary separating unit 14 can be simplified. As illustrated in FIG. 6, the driving system is formed by a chain 44 driven by a sprocket 45 which is driven by a drive mechanism 46. The rotor cage 38 of the rotary separating unit 14 is supported by a central axle box 40 and some support bearings 42. This structure of the driving systems is simpler than e.g. a geared bottom plate driven by a pinion gear which is used in conventional separating devices.

Figure 4A:
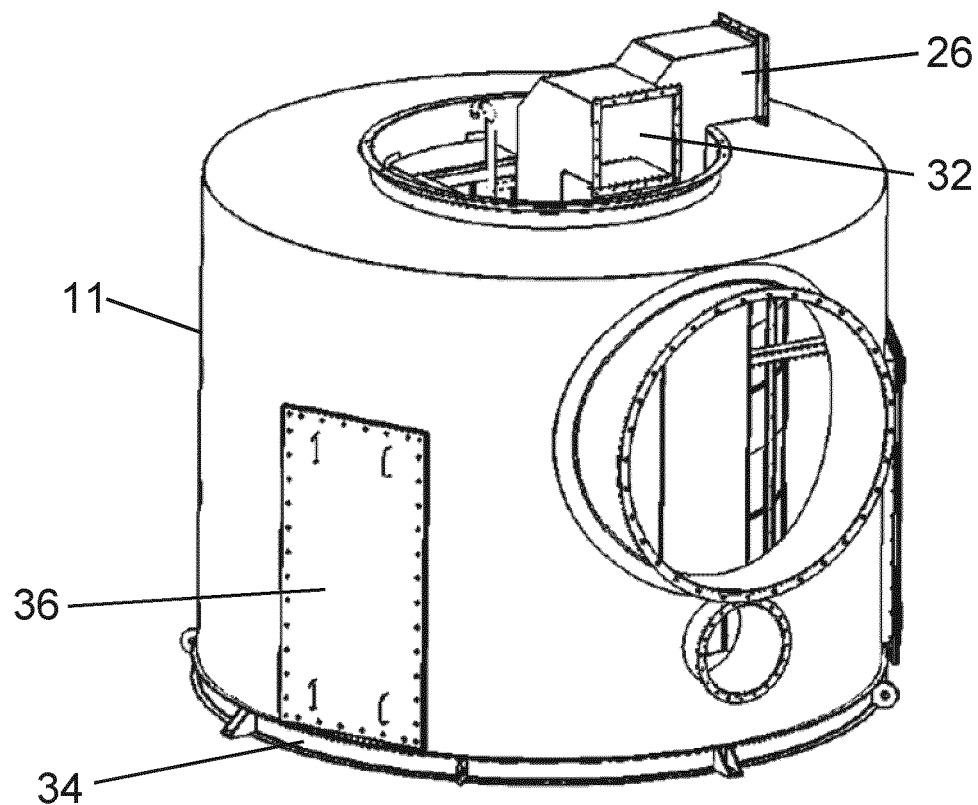
FIG. 4A is a perspective view of a variant of regenerative device of FIG. 4 according to the present invention.

Above-discussed FIGS. 4 and 6 exemplarily show a first variant of the first embodiment of the inventive separating device 10, in which the housing 11 and the rotary separating unit 14 are mounted on a polygonal base 34, wherein the edges of the base 34 preferably protrude from the circumferential wall 12 of the cylindrical housing 11. Further, FIGS. 4A and 6A exemplarily show a second variant of the first embodiment of the inventive separating device 10, in which the housing 11 and the rotary separating unit 14 are mounted on a round base 34, wherein the edge of the base 34 may lie under or protrude from the circumferential wall 12 of the cylindrical housing 11.

Figure 7:
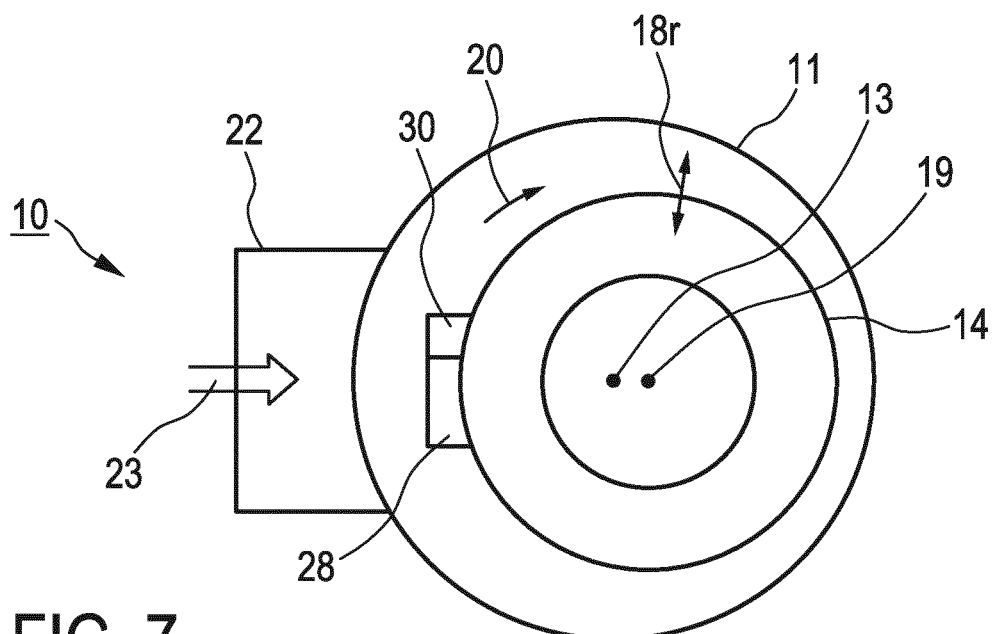
FIG. 7 is a schematic top view of a regenerative separating device according to a second embodiment of the present invention.

FIG. 7 illustrates schematically a second embodiment of a separating device 10 according to the inventive concept.

The separating device 10 according to this embodiment differs from the first embodiment in that the cylinder axis 13 of the cylindrical housing 11 is offset to the rotational axis 19 of the rotary separating unit 14. As a consequence, the annular gap 16 between the circumferential wall 12 of the housing 11 and the rotary separating unit 14 has a tapered width in the radial direction 18r becoming narrower in the direction away from the airflow inlet 22.

The tapered gap 16, in particular uniformly tapered gap 16, improves the flow guidance of the airflow 23 towards the filter blocks 15. In the area near the airflow inlet 22, due to the relative large width of the annular gap 16, the fluidic constraint to flow into the filter blocks 15 of the separating unit 14 is quite small. Thus, a larger part of the airflow 23 is guided farther into the annular gap 16. The uniform flow distribution of the airflow 23 into the filter blocks 15 allows a more efficient operation of the separating device 10.

Figure 8:
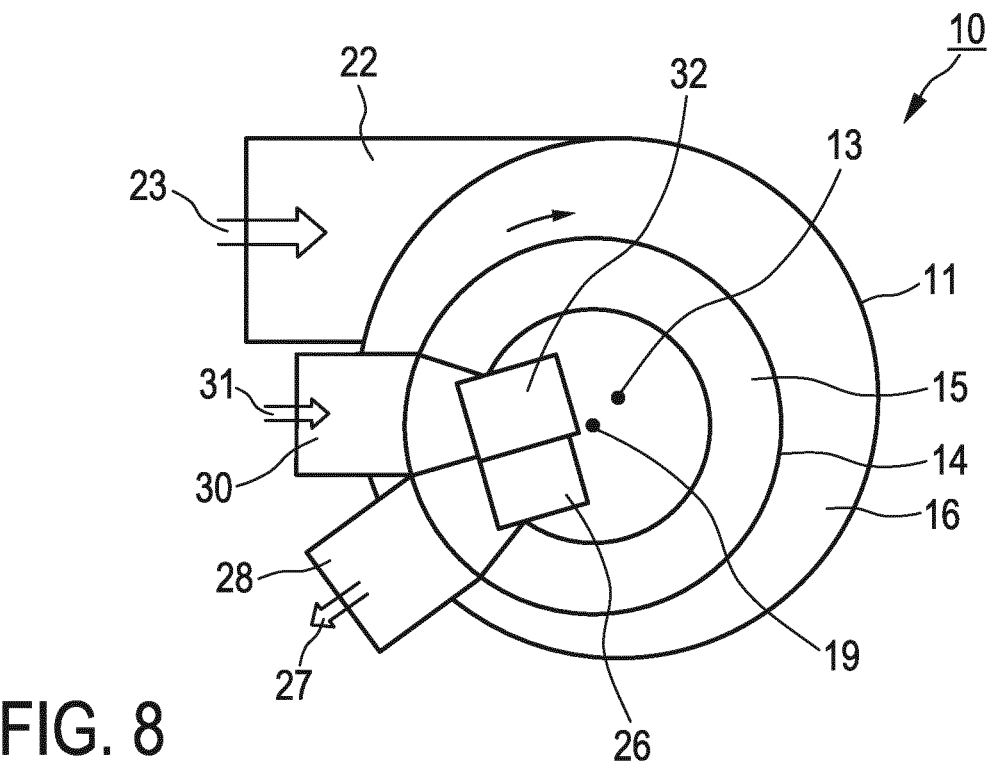
FIG. 8 is a schematic top view of a regenerative separating device according to a third embodiment of the present invention.
Figure 9:
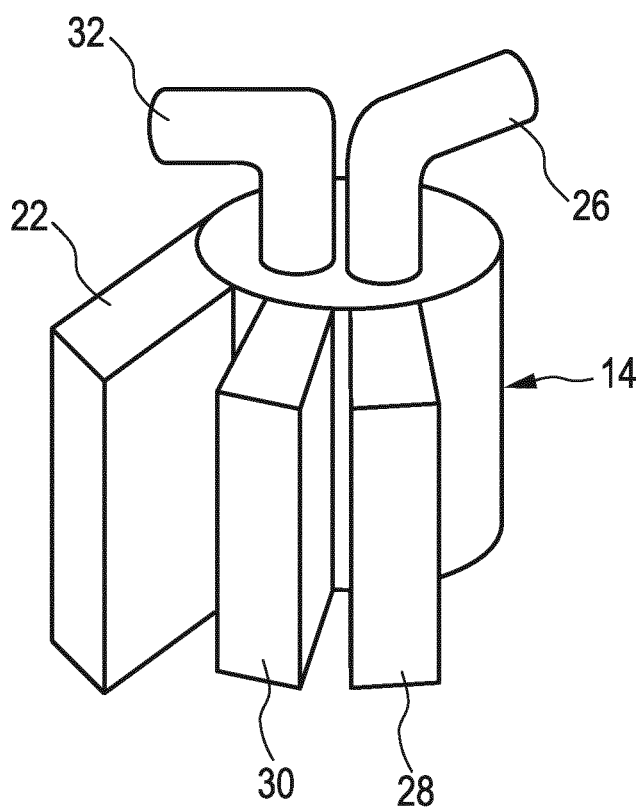
FIG. 9 is a schematic perspective view of the regenerative separating device shown in FIG. 8.

FIGS. 8 and 9 illustrate schematically a third embodiment of a separating device 10 according to the inventive concept.

The separating device 10 according to this embodiment differs from the first and second embodiments especially in that the airflow inlet 22 is offset to the regeneration system (inlet 26 and outlet 28) and the cooling system (inlet 30 and outlet 32) in the circumferential direction 18c so that the airflow inlet 22 and the regeneration system 26, 28 are positioned in the same circumferential sector of maximum about 45 degrees, and that the airflow inlet 22 is configured to introduce the airflow 23 in tangential direction (instead frontally) into the annular gap 16. The annular gap 16 is continuously tapered over the whole separating zone, resulting in a more uniform airflow 23 into the filter blocks 15.

In this embodiment, the airflow 23 is not hitting the regeneration stream outlet 28. Therefore, a clearer thermal separation between the "cold" filtering/adsorption and the "warm" regeneration/desorption can be achieved. Thus, thermal insulation measures can be reduced.

Figure 10:
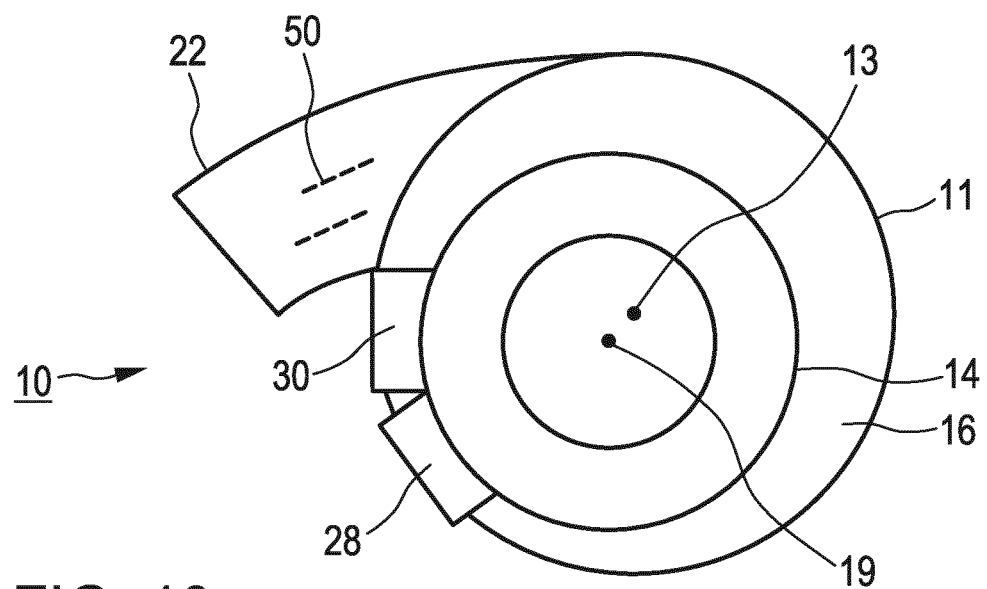
FIG. 10 is a schematic top view of a regenerative separating device according to a fourth embodiment of the present invention.

FIG. 10 illustrates schematically a fourth embodiment of a separating device 10 according to the inventive concept.

The separating device 10 according to this embodiment differs from the third embodiment in that at least one baffle 50 for guiding the airflow 23 is provided in the airflow inlet 22. By this at least one baffle 50, the flow guidance of the airflow 23 into and in the annular gap 16 can be influenced and improved to achieve an even more uniform distribution of airflow 23 into the filter blocks 15.

Optionally, the baffles 50 may be configured to be controlled variably. Further, the airflow inlet 23 may optionally be configured such that the flow area may be controlled variably.

The embodiments of the separating device 10 discussed above may be used in a system including the separating device 10 and a cleaning device for extracting the impurities from the regeneration stream 27. Such a system is disclosed e.g. in US 2017/0266606 A1.

In the above embodiments, the regeneration system comprises one regeneration stream outlet 28 for discharging the whole regeneration stream 27 having passed through the filter blocks 15. In variants of the embodiments, the regeneration stream outlet 28 may be divided into two sections, in the circumferential direction 18c, for discharging a first partial regeneration stream and a second partial regeneration stream. In this configuration, the regeneration stream outlet 28 preferably comprises a divider being configured to variably control the widths of these two sections. The features and effects of such a regeneration system are discussed in detail e.g. in US 2017/0266606 A1.

The embodiments described above are to be understood as illustrative examples of embodiments of this invention. Further embodiments of the present invention will become apparent to a person skilled in the art given the disclosure herein. The scope of this invention is not limited by the exemplary embodiments discussed above, but only by the following claims.

While a particular embodiment of the present regenerative separating device for separating impurities from an airflow has been described herein, it will be appreciated by those skilled in the art that changes and modifications may be made thereto without departing from the invention in its broader aspects and as set forth in the following claims.

LIST OF REFERENCE SIGNS 10 separating device
11 (cylindrical) housing 12 circumferential wall of 11
13 cylinder axis
14 rotary separating unit
15 filter blocks
16 annular gap
18c circumferential direction
18r radial direction
19 rotational axis of 14
20 rotational direction of 14
22 airflow inlet for introducing an airflow
23 airflow, esp. process exhaust airflow
24 airflow outlet for discharging clean air
26 regeneration stream inlet for introducing regeneration stream
27 regeneration stream
28 regeneration stream outlet for discharging regeneration stream
30 cooling airflow inlet for introducing cooling airflow
31 cooling airflow
32 cooling airflow outlet for discharging cooling airflow
34 base
36 door as inspection access
38 rotor cage
38a,b,c parts of rotor cage
40 axle box
42 support bearing
44 chain
45 sprocket
46 drive mechanism
50 baffle/air guide plate

The invention claimed is:

1. A regenerative separating device for separating impurities from an airflow, in particular a process exhaust airflow, comprising:
a rotary separating unit defining a radial direction and a circumferential direction, and comprising a plurality of filter blocks for receiving impurities from an airflow passing through said filter blocks in said radial direction;
a housing for incorporating said rotary separating unit with an annular gap between a circumferential wall of said housing and said rotary separating unit, wherein said housing has an airflow inlet provided in said circumferential wall for introducing an airflow into said annular gap;
a regeneration system for regenerating said filter blocks of said rotary separating unit by a regenerating stream passing through said filter blocks in said radial direction to remove impurities received in said filter blocks; and
a cooling system for directing a cooling airflow through said filter blocks in said radial direction, said cooling system being arranged between said regeneration system and said airflow inlet in a rotational direction,
wherein said airflow inlet and said regeneration system are both positioned in the same circumferential sector of maximum 180 degrees.

2. The regenerative separating device according to claim 1, wherein said housing is a cylindrical housing.

3. The regenerative separating device according to claim 1, wherein said airflow inlet and said regeneration system overlap each other in said circumferential direction; and
said airflow inlet is configured to radially introduce an airflow into said annular gap between said circumferential wall of said housing and said rotary separating unit.

4. The regenerative separating device according to claim 1, wherein said airflow inlet and said regeneration system are arranged next to each other in said circumferential direction; and
said airflow inlet is configured to introduce an airflow in a tangential direction into said annular gap between said circumferential wall of said housing and said rotary separating unit.

5. The regenerative separating device according to claim 1, wherein said annular gap between said circumferential wall of said housing and said rotary separating unit has a tapered width in said radial direction becoming narrower in a direction away from said airflow inlet.

6. The regenerative separating device according to claim 5, wherein said cylindrical housing has a cylinder axis, and said rotary separating unit has a rotational axis; and
said cylinder axis and said rotational axis are offset to each other.

7. The regenerative separating device according to claim 1, wherein, in said airflow inlet, there is provided at least one baffle for guiding an airflow.

8. The regenerative separating device according to claim 1, wherein
said regeneration system comprises a regeneration stream outlet for discharging said regeneration stream having passed through said filter blocks; and
said regeneration stream outlet is divided into two sections, in said circumferential direction, for discharging a first partial regeneration stream and a second partial regeneration stream.

9. The regenerative separating device according to claim 8, wherein said regeneration stream outlet comprises a divider being configured to variably control the widths of said two sections.

10. The regenerative separating device according to claim 1, wherein said rotary separating unit comprises a rotor cage for mounting said plurality of filter blocks.

11. The regenerative separating device according to claim 1, wherein said rotary separating unit is rotated by a driving system comprising a chain and a sprocket.

12. The regenerative separating device according to claim 1, wherein said housing comprises just two doors as inspection accesses, said two doors being positioned in the same circumferential sector of maximum 180 degrees as said airflow inlet and said regeneration system.

13. A system for separating impurities from an airflow, in particular a process exhaust airflow, comprising:
a regenerative separating device according to claim 1,
and a cleaning device for extracting the impurities from said regeneration stream.

14. The system of claim 13, wherein said cleaning device is configured for regenerative thermal oxidation (RTO), direct thermal oxidation (TO), recuperative catalytic oxidation (CO), regenerative catalytic oxidation (RCO) or condensation, or comprises a gas turbine aggregate having a combustion apparatus for combusting the combustible components contained in said regeneration stream.

15. A regenerative separating device for separating impurities from an airflow, in particular a process exhaust airflow, comprising:
a rotary separating unit defining a radial direction and a circumferential direction, and comprising a plurality of filter blocks for receiving impurities from an airflow passing through said filter blocks in said radial direction;
a housing for incorporating said rotary separating unit with an annular gap between a circumferential wall of said housing and said rotary separating unit, wherein said housing has an airflow inlet provided in said circumferential wall for introducing an airflow into said annular gap; and a regeneration system for regenerating said filter blocks of said rotary separating unit by a regenerating stream passing through said filter blocks in said radial direction to remove impurities received in said filter blocks, said regeneration system comprises a regeneration stream outlet for discharging said regeneration stream having passed through said filter blocks; and said regeneration stream outlet is divided into two sections, in said circumferential direction, for discharging a first partial regeneration stream and a second partial regeneration stream, wherein said airflow inlet and said regeneration system are both positioned in the same circumferential sector of maximum 180 degrees.

16. The regenerative separating device according to claim 15, wherein said regeneration stream outlet comprises a divider being configured to variably control the widths of said two sections.

\* \* \* \* \*